United States Patent
Burgan et al.

(10) Patent No.: US 7,626,355 B2
(45) Date of Patent: Dec. 1, 2009

(54) PORTABLE ELECTRONIC DEVICE AND METHOD TO PROTECT SAME

(75) Inventors: John M. Burgan, North Palm Beach, FL (US); Andrew F. Burton, Coral Springs, FL (US); Ronald S. Coapstick, Fort Lauderdale, FL (US); Jon S. Miller, Cooper City, FL (US); Joseph Patino, Pembroke Pines, FL (US); Russell L. Simpson, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 206 days.

(21) Appl. No.: 11/289,104

(22) Filed: Nov. 29, 2005

(65) Prior Publication Data
US 2007/0120528 A1    May 31, 2007

(51) Int. Cl.
*H02J 7/00* (2006.01)
*G11B 21/02* (2006.01)

(52) U.S. Cl. .................... 320/106; 320/114; 360/75

(58) Field of Classification Search .............. 320/11, 320/30, 48, 106, DIG. 21, 113, 114; 73/488, 73/200; 360/60, 75, 551.01
See application file for complete search history.

(56) References Cited

U.S. PATENT DOCUMENTS

| 4,862,394 A * | 8/1989 | Thompson et al. ........... 702/166 |
| 7,059,182 B1 * | 6/2006 | Ragner ........................ 73/200 |
| 2004/0125493 A1 * | 7/2004 | Shimotono et al. ............. 360/75 |
| 2005/0073764 A1 * | 4/2005 | Ogawa et al. ................. 360/60 |
| 2005/0141127 A1 * | 6/2005 | Shimotono et al. ............ 360/75 |
| 2006/0152842 A1 * | 7/2006 | Pasolini et al. ................ 360/75 |

* cited by examiner

*Primary Examiner*—Edward Tso
*Assistant Examiner*—M'Baye Diao
(74) *Attorney, Agent, or Firm*—Larry Brown; Sylvia Chen

(57) ABSTRACT

A portable electronic device and a method to protect the portable electronic device from a battery bounce are provided. The portable electronic device (100) can comprise a free-fall condition sensor (105) enabled to detect a pre-battery bounce condition in the portable electronic device and a processor (110) coupled to the free-fall condition sensor (105). The processor (110), in response to a detection of the pre-battery bounce condition by the free-fall condition sensor (105), can be programmed to place the portable electronic device (100) in a pre-battery bounce setting. The method can include detecting a pre-battery bounce condition in the portable electronic device (405) and in response to the detection of the pre-battery bounce condition (405), placing the portable electronic device in a pre-battery bounce setting (410).

16 Claims, 5 Drawing Sheets

PORTABLE ELECTRONIC DEVICE AND METHOD TO PROTECT SAME

FIELD OF INVENTION

The present invention generally relates to a portable electronic device. More specifically, the present invention relates to reducing the effects of a battery bounce condition in the portable electronic device.

BACKGROUND OF THE INVENTION

Many electric circuits can include components that have mechanical contacts. One typical example is a battery mated to electrical equipment, which is useful because it simplifies replacement. Because of the mechanical contacts, however, interruption of these circuits may occur. In particular, a battery bounce condition can occur when a portable electronic device under a free-fall condition hits a surface. The battery bounce condition is not desired in portable electronic devices that use spring loaded electrical contacts, as a sudden G-Force shock to the portable electronic device can cause the battery to momentarily lose electrical contact. As a result, the portable electronic device can shut down or reset when the battery bounce condition occurs.

Conventionally, portable electronic devices can incorporate circuitry to prevent battery bounce condition from affecting the operation of the portable electronic device. The circuitry can generally include a main power supply, a backup battery and a capacitor. The capacitor can hold the main power supply up until the backup battery can be switched in. The capacitor is of relatively high capacitance value and has relatively large dimension in order hold the main power supply up until the backup battery can be switched in. This capacitor, however, can significantly add to the expense of the electronic device.

SUMMARY OF THE INVENTION

The present invention provides a portable electronic device. The portable electronic device can include a free-fall condition sensor and a processor coupled to the free-fall condition sensor. The free-fall condition sensor can be enabled to detect a pre-battery bounce condition in the portable electronic device. A free-fall condition generally refers to an unintentional or intentional dropping of the portable electronic device from a height above a surface. Also, a pre-battery bounce condition can be that moment in time that exists before a portable electronic device that is in a free-fall condition strikes a surface. The processor, in response to a detection of the pre-battery bounce condition by the free-fall condition sensor, can be programmed to place the portable electronic device in a pre-battery bounce setting.

The portable electronic device may further include non-critical components. The non-critical components can include a display backlight, a transmitter, a camera or a digital media player. The processor can place the portable electronic device in the pre-battery bounce setting by shutting down non-critical components in the portable electronic device, storing a last known state in the portable electronic device, preventing a memory-write or attempting to complete a memory-write.

The portable electronic device may further include a memory. The memory can include a first memory and a second memory. The first memory can store non-critical data and the second memory can store critical data. The processor can be further programmed to store the last known state or a lock/unlock password in the first memory if a pre-battery bounce condition is detected. The processor can further be programmed to prevent a memory-write to the second memory if a pre-battery bounce condition is detected. The processor can also be programmed to prevent or attempt to complete a memory-write to the first memory if a pre-battery bounce condition is detected.

Also, the processor can be programmed to determine whether a false pre-battery bounce condition exists before placing the portable electronic device in the pre-battery bounce setting. The processor can also be programmed to determine when a battery bounce condition has ended. The processor can then switch the operation of the portable electronic device from the pre-battery bounce setting to a normal state.

The present invention also concerns a method to protect a portable electronic device. The method can include detecting a pre-battery bounce condition in the portable electronic device and in response to the detection of the pre-battery bounce condition, placing the portable electronic device in a pre-battery bounce setting.

The method of placing the portable electronic device in the pre-battery bounce setting can further include shutting down non-critical components in the portable electronic device, storing a last known state in the portable electronic device, preventing a memory-write or attempting to complete a memory-write. The non-critical components of the portable electronic device can include a display backlight, a transmitter, a camera or a digital media player such as a digital music player.

The memory of the portable electronic device can include a first memory and a second memory. The method of placing the portable electronic device in the pre-battery bounce setting can further include storing non-critical data in the first memory and storing critical data in the second memory. The method can further include storing the last known state or a lock/unlock password in the first memory if a pre-battery bounce condition is detected. The method can further include preventing a memory-write to the second memory if a pre-battery bounce condition is detected and preventing or attempting to complete a memory-write to the first memory if a pre-battery bounce condition is detected.

The method to protect the portable electronic device can further include determining whether a false pre-battery bounce condition exists before placing the portable electronic device in the pre-battery bounce setting. The method can further include determining when a battery bounce condition has ended and switching the operation of the portable electronic device from the pre-battery bounce setting to a normal state.

In another embodiment of the present invention, a computer program product for use with a computer can be provided. The computer program product can include a computer usable medium having a computer readable program code embodied into the computer usable medium. The computer readable program code can protect a portable electronic device in a free-fall condition.

The computer readable program code can cause the portable electronic device to detect a pre-battery bounce condition. In response to the detection of the pre-battery bounce condition, the computer readable program code can cause the portable electronic device to place itself in a pre-battery bounce setting. The computer readable program code can further cause the portable electronic device to place itself in the pre-battery bounce setting by shutting down non-critical components in the portable electronic device, storing a last known state in the portable electronic device, preventing a memory-write or attempting to complete a memory-write. The computer readable program code can further cause the portable electronic device to determine whether a false pre-battery bounce condition exists before placing itself in the pre-battery bounce setting.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements.

DETAILED DESCRIPTION OF THE INVENTION

Figure 1:
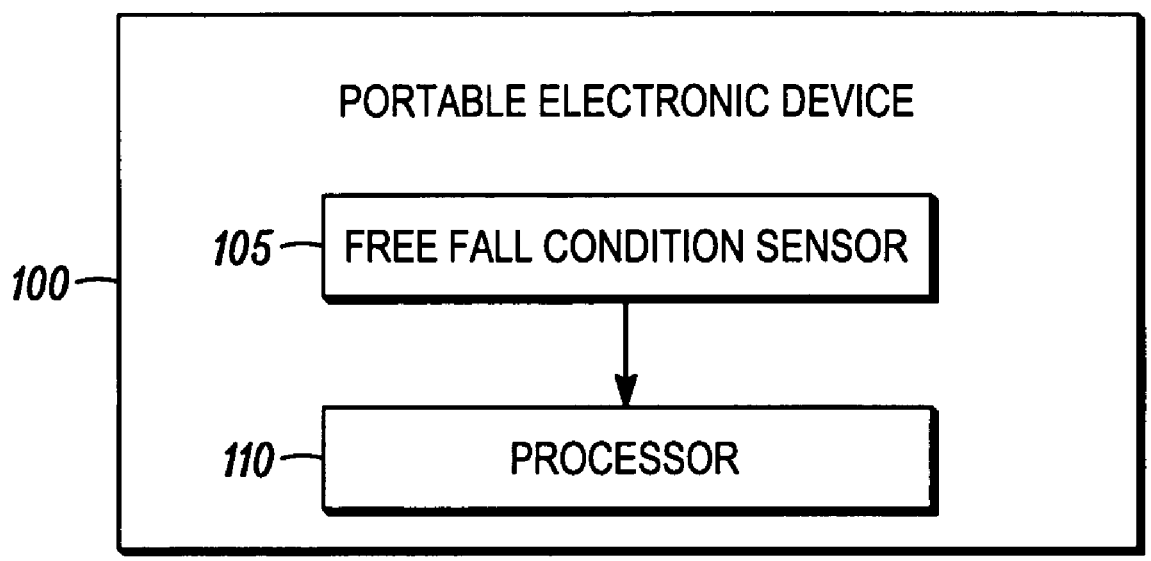
FIG. 1 illustrates a block diagram of a portable electronic device in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention relates to a portable electronic device and a method of protecting the portable electronic device from a battery bounce condition. The battery bounce condition can occur when the portable electronic device is in a free-fall condition and hits a surface. The free-fall condition can be the intentional or unintentional dropping of the portable electronic device from a height above a surface. For example, a cell phone can be in the free-fall condition if it is dropped from a table above a floor surface. A free-fall condition sensor can detect a pre-battery bounce condition in a portable electronic device based on a parameter, and the device can be placed in a pre-battery bounce setting, several examples of which will be described below.

The pre-battery bounce condition can be a moment in time that exists before the portable electronic device that is under a free-fall condition strikes a surface. The parameter can be for example, a sudden decrease in a G-force in the portable electronic device. The value of this G-force measurement can be below a set threshold to account for false detections. In addition and as an option, the decrease in the G-force measurement should be present for a predetermined amount of time before the portable device is placed in the pre-battery bounce setting. Those of skill in the art will, however, appreciate that the invention is not limited to the examples of the parameter mentioned above, and the invention shall have full scope of the claims.

The free-fall condition sensor can be used in a portable electronic device like a cell phone, a laptop or a radio to provide a warning of a pre-battery bounce condition. Those of skill in the art will, however, appreciate that the invention is not limited to the examples of the portable electronic device mentioned above, and the invention shall have the full scope of the claims.

FIG. 1 shows a block diagram of a portable electronic device 100 in accordance with an embodiment of the inventive arrangements. The portable electronic device 100 can include a free-fall condition sensor 105 and a processor 110 coupled to the free-fall condition sensor 105. The free-fall condition sensor 105 may be one or more accelerometers and can detect a pre-battery bounce condition in the portable electronic device 100. A pre-battery bounce condition is a moment in time that exists before a portable electronic device that is under a free-fall condition strikes a surface. Free-fall condition can generally mean the unintentional or intentional dropping of the portable electronic device 100 from a height above a surface. The free-fall condition can be associated with a sudden decrease in G-force of the portable electronic device 100. The processor 110, in response to detection of the pre-battery bounce condition, can be programmed to place the portable electronic device 100 in pre-battery bounce setting. This is further explained in conjunction with FIG. 2.

Figure 2:
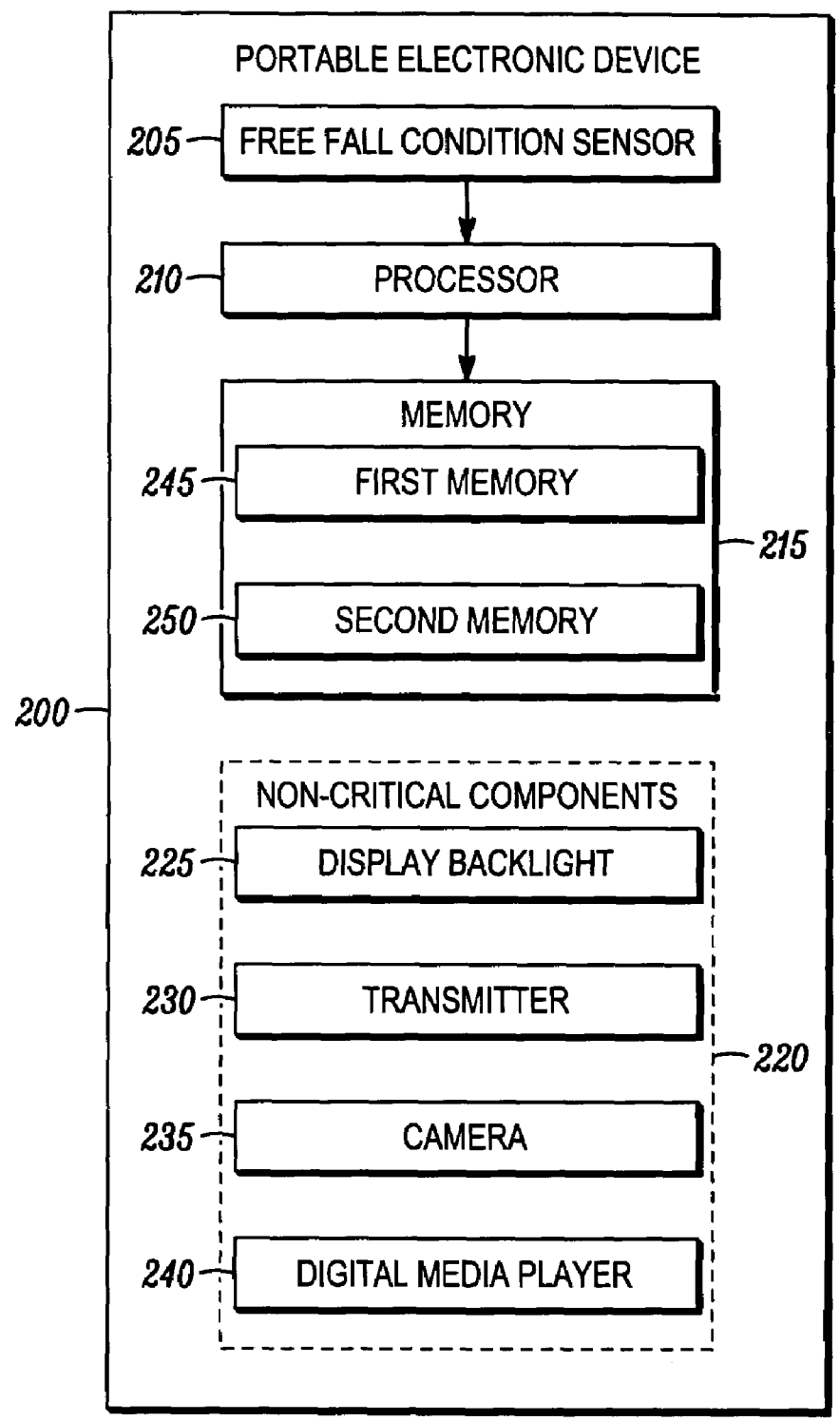
FIG. 2 illustrates a block diagram of a portable electronic device in accordance with another embodiment of the inventive arrangements.

FIG. 2 shows a block diagram of a portable electronic device 200 in accordance with another embodiment of the inventive arrangements. The portable electronic device 200 can include the free-fall condition sensor 205, the processor 210, a memory 215 and non-critical components 220. The memory 215 can be coupled to the processor 110. A non-critical component can be a component in the portable electronic device that can be shut down during a pre-battery bounce condition without causing the potential loss or corruption of data in the portable electronic device. The non-critical component 220 can be, for example, a display backlight 225, a transmitter 230, a camera 235 or a digital media player 240, such as a digital music player.

When the free-fall condition sensor 205 detects the pre-battery bounce condition in the portable electronic device 200, the free-fall condition sensor 205 can indicate the condition to the processor 210 by sending a signal to the processor 210. For example, the free-fall condition sensor 205 may detect a sudden drop in G-forces on the device 200, which may last for a predetermined amount of time. The processor 210, in response to receiving the indication from the free-fall condition sensor 205, can place the portable electronic device 200 in a pre-battery bounce setting. The processor 210 may also wait for a predetermined time before initiating a pre-battery bounce procedure. The pre-battery bounce procedure can be a procedure to place the portable electronic device 200 in the pre-battery bounce setting. The processor 210 or the free-fall condition sensor 205 can provide the predetermined time to detect whether a false pre-battery bounce condition exists before placing the portable electronic device 200 in the pre-battery bounce setting.

According to an embodiment, the processor 210 may place the portable electronic device 200 in the pre-battery bounce setting by shutting down the non-critical components 220 in the portable electronic device 200. The processor may also store a last known state in the portable electronic device 200. This last known state can represent the state of any suitable number of components or processes that was present just before the pre-battery bounce condition was detected. For example, the information being displayed on a display can be stored prior to the battery-bounce condition. The processor 210 can also prevent a memory-write or can attempt to complete a memory-write in the portable electronic device 200.

Further, power requirements of the portable electronic device 200 can be reduced by shutting down the non-critical components 220 prior to the battery-bounce condition. Therefore, because these components may be shut down, a large capacitor required to maintain power until the backup battery is switched on may not be necessary. The processor 210 can shut down the non-critical components 220 of the portable electronic device 200 including one or more of the display backlight 225, the transmitter 230, the camera 235 or the digital media player 240.

In an embodiment of the present invention, the memory 215 of the portable electronic device 200 can include a first memory 245 and a second memory 250. The first memory 245 can store non-critical data. Non-critical data can be data that can afford to be corrupted if a battery bounce condition occurs; for example, non-critical data can be a last known state of the portable electronic device 200, a lock/unlock password and real time clock. Those of skill in the art will, however, appreciate that the invention is not limited to the examples of the non-critical data mentioned above and the invention shall have full scope of the claims. The second memory 250 can store critical data. Critical data can be data that is desired to remain uncorrupted during a battery bounce condition. Critical data may be, for example, an address book. Those of skill in the art will, however appreciate that the invention is not limited to the examples of the critical data mentioned above and the invention shall have full scope of the claims.

The processor 210 can be programmed to store the last known state of the portable electronic device 200 in order to avoid excessive writes. The processor 210 can avoid excessive writes by storing an updated last known state of the portable electronic device 200 in the first memory 245. This data can be stored in the first memory 245 because it may be considered non-critical data, as the user will most likely not be concerned with the corruption of this type of data. If this data were corrupted for some reason, such as the battery bounce condition occurring before it could be saved into the first memory 245, once the battery bounce condition is over, the user may simply return the electronic device 200 to its last known state or may re-enter the lock/unlock password. Therefore, the processor 110 can be programmed to store the last known state and the lock/unlock password in the first memory 245.

In an exemplary embodiment of the present invention, the portable electronic device 200 is in an unlocked state and the user is in the midst of writing a data into the second memory 250 when the free-fall condition sensor 205 detects a pre-battery bounce condition in the portable electronic device 200. The processor 210 in response to the free-fall condition sensor 205 detecting the pre-battery bounce condition can place the portable electronic device 200 in a pre-battery bounce setting by storing or attempting to store the unlocked state along with the unlock password in the first memory 245. When the portable electronic device 200 passes the battery bounce condition and regains power, the portable electronic device 200 can be returned to the unlocked state, assuming the write to the first memory 245 was successful.

In one arrangement, the processor 210 can be programmed to prevent the memory-write if the memory-write is to be done at the second memory 250 when the free-fall condition sensor 205 detects a pre-battery bounce condition. Since the second memory 250 stores the critical data, data corruption at the second memory 250 can be avoided by preventing the memory-write to the second memory 250 when the pre-battery bounce condition is detected. For example, if a user is entering a new contact entry into the device 200 and drops the device 200, the processor 210 may not attempt to write the data to the second memory 250 to prevent corruption of the phonebook or address book. The processor 110 can also be programmed to prevent or attempt to complete the memory-write if the memory-write is done at the first memory 245, as the corruption of the non-critical data is not a major concern. The memory-write to the first memory 245 can be completed using a capacitor. The capacitor can maintain the power till the memory-write to the first memory 245 is completed.

In another embodiment of the present invention, the portable electronic device 200 can also include a receiver (not shown) along with the transmitter 230. The processor 210 can place the portable electronic device 200 in the pre-battery bounce setting by creating a pause for the transmitter 230 and also by sending the pause to the receiver (not shown). A pause can generally refer to a temporary suspension of activities, which in this case can include stopping the transmission and/or receipt of wireless signals during the detected pre-battery bounce condition.

The processor 210 can be programmed to check for a false pre-battery bounce condition before placing the portable electronic device 200 in a pre-battery bounce setting. A false pre-battery bounce condition can be a condition where the portable electronic device 200 is not under free-fall condition and corresponds to a normal movement of the portable electronic device, although the free-fall condition sensor 205 may initially detect such movement as a pre-battery bounce condition. For example, when a person is jogging or exercising, the portable electronic device 200 can have a very short duration of zero G-Force, as compared to a true free-fall condition having an extended duration of a zero G-force. By measuring a parameter, such as the time duration or frequency of the zero G-force, of the portable electronic device 200, the free-fall condition sensor 205 or the processor 210 can differentiate the free-fall condition of the portable electronic device 200 from a normal movement of the portable electronic device 200. Those of skill in the art will, however, appreciate that the invention is not limited to the examples of the parameter mentioned above, and the invention shall have full scope of the claims.

The processor 210 can further be programmed to determine when a battery bounce condition has ended and to switch the operation of the portable electronic device 200 from the pre-battery bounce setting to a normal state. The battery bounce condition is ended when the drop is finished and the main power supply has regained its connection and is providing power. The method of switching the operation of the portable electronic device 200 from the pre-battery bounce setting to a normal state can include powering the non-critical components 220 in the portable electronic device 200, placing the portable electronic device 200 in the last known state and enabling the memory-writes that were previously prevented from occurring. The method of switching the operation of the portable electronic device 200 from the pre-battery bounce setting to a normal state corresponds to enabling the portable electronic device 200 to assume a normal operation.

Figure 3:
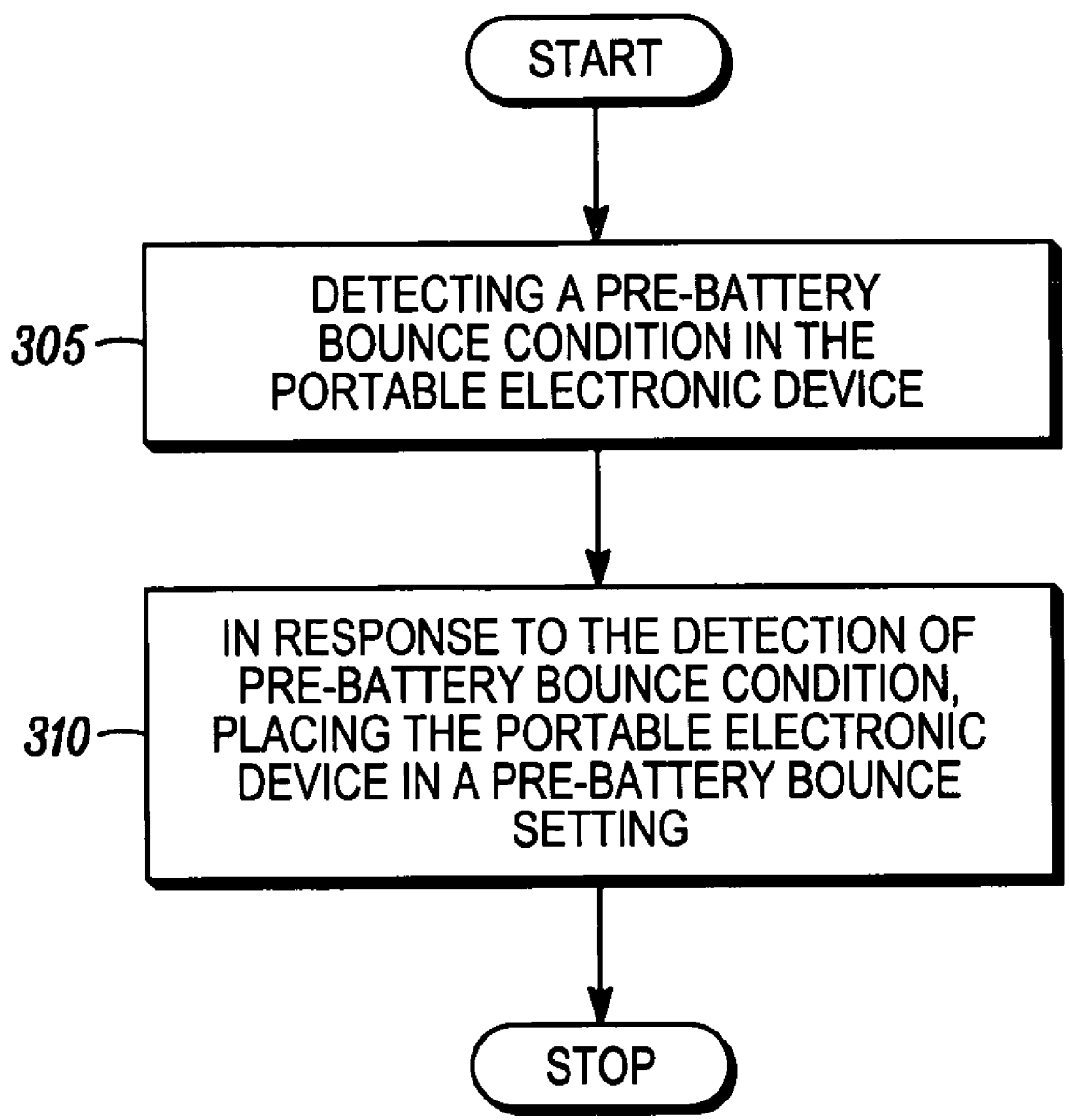
FIG. 3 illustrates a flow diagram of a method to protect a portable electronic device in accordance with an embodiment of the inventive arrangements.

FIG. 3 illustrates a flow diagram showing a method to protect a portable electronic device in accordance with an embodiment of the inventive arrangements. At step 305, a pre-battery bounce condition in the portable electronic device is detected and at step 310, the portable electronic device can be placed in a pre-battery bounce setting in response to the detection of the pre-battery bounce condition. This is further explained in conjunction with FIG. 4.

Figure 4:
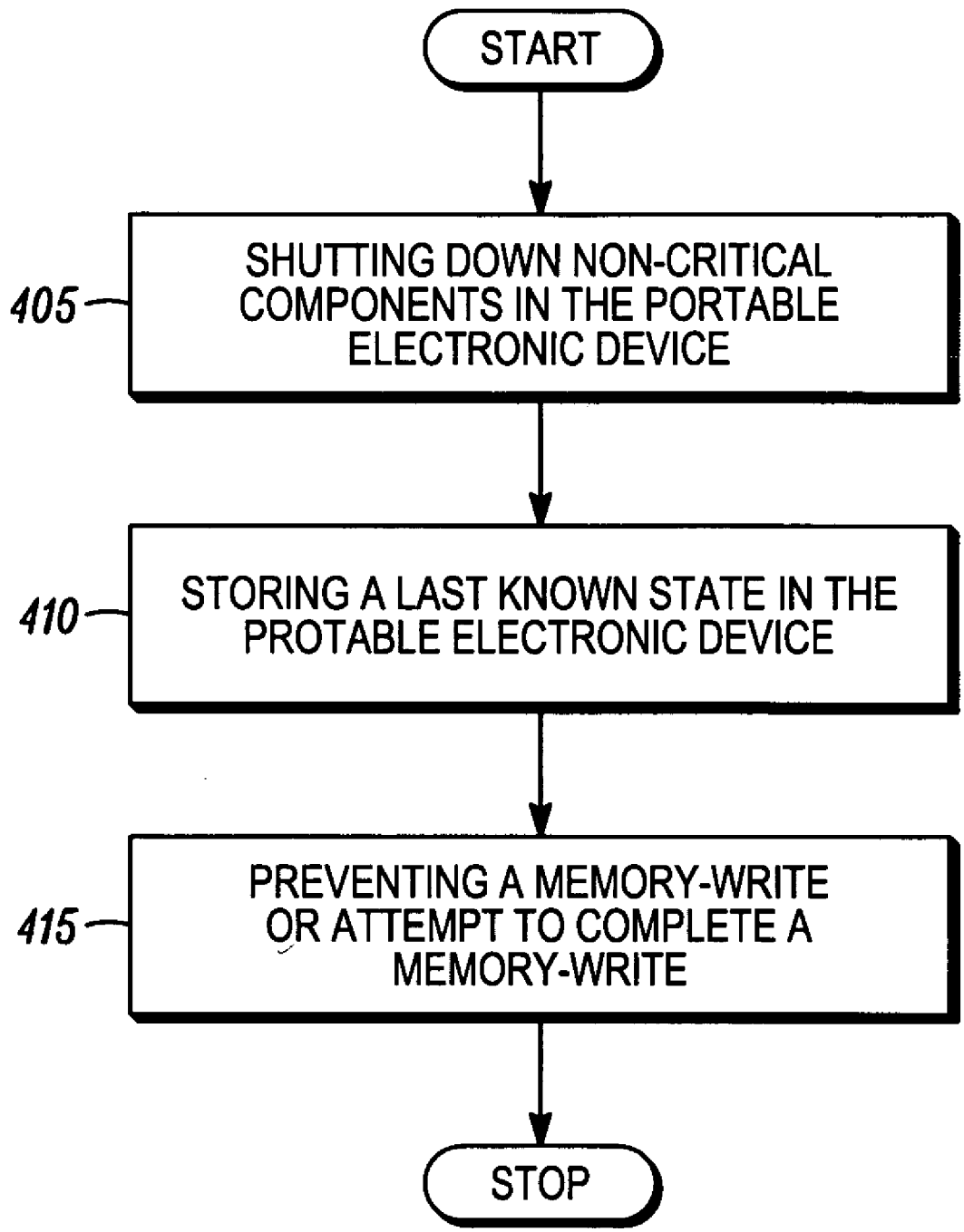
FIG. 4 illustrates a flow diagram of a method of placing the portable electronic device in a pre-battery bounce setting in accordance with an embodiment of the inventive arrangements.

FIG. 4 illustrates a flow diagram of a method of placing the portable electronic device in a pre-battery bounce setting in accordance with an embodiment of the present invention. At step 405, the method can include shutting down non-critical components in the portable electronic device, at step 410 storing a last known state in the portable electronic device, and at step 415 preventing a memory-write or attempting to complete a memory-write. The non-critical components can include a display backlight, a transmitter, a camera or a digital media player.

The method further includes storing non-critical data, such as last known state of the portable electronic device, lock/unlock password and real time clock in a first memory when a pre-battery bounce condition is detected. The method of storing the last known state of the portable electronic device can further include storing an updated last known state of the portable electronic device in order to avoid excessive writes.

In accordance with an embodiment of the present invention, the method of preventing a memory-write can further include preventing a memory-write to the second memory. The method of preventing the memory-write to the second memory can avoid the possibility of data corruption in the second memory. The method can further include preventing a memory-write to the first memory or attempting to complete the memory-write to the first memory. The memory-write to the first memory can be completed using a capacitor with a predetermined capacitance, if the main battery has lost contact and the back-up battery has not yet been switched in. The capacitor can maintain the power until the memory-write to the first memory is completed.

Figure 5:
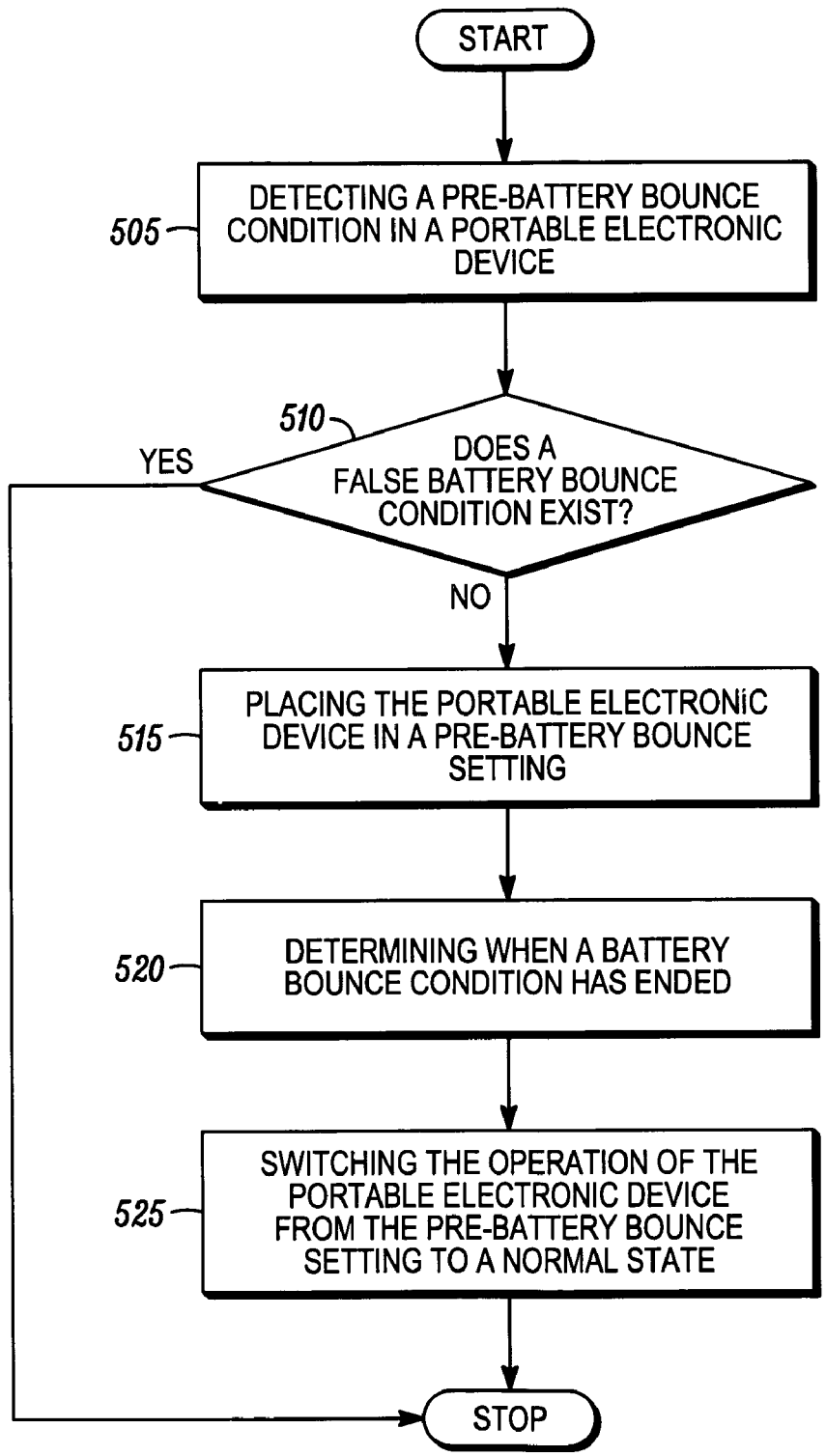
FIG. 5 illustrates a flow diagram of a method to protect a portable electronic device in accordance with another embodiment of the inventive arrangements.

FIG. 5 illustrates a method of protecting the portable electronic device in accordance with another embodiment of the inventive arrangements. At step 505, the method can include detecting a pre-battery bounce condition in the portable electronic device and at step 510, in response to the detection of the pre-battery bounce condition, placing the portable electronic device in a pre-battery bounce setting. At step 515, the method can further include determining whether a false pre-battery bounce condition exists before placing the portable electronic device in pre-battery bounce setting. A predetermined time period can be provided to detect whether a false pre-battery bounce condition exists before placing the portable electronic device in pre-battery bounce setting.

In another embodiment of the present invention, the method of placing the portable electronic device in the pre-battery bounce setting may include storing non-critical data, such as a last known state, lock/unlock password and real time clock of the portable electronic device in response to the detection of the pre-battery bounce condition. The method can further include providing a predetermined time period to detect whether a false pre-battery bounce condition exists prior to shutting down the non-critical components in the portable electronic device or preventing a memory-write.

At step 520, the method can further include determining when the battery bounce condition has ended and at step 525, switching the operation of the portable electronic device from the pre-battery bounce setting to a normal state. The method of switching the operation of the portable electronic device from the pre-battery bounce setting to the normal state can include powering the non-critical components in the portable electronic device, placing the portable electronic device in the last known state and enabling the memory-write.

In accordance with another embodiment a computer program product for use with a computer is provided. The computer program product can include a computer usable medium. The computer usable medium can have a computer readable program code embodied into the computer usable medium. The computer readable program code can protect a portable electronic device in a free-fall condition. The computer readable program code can cause a free-fall condition sensor to detect a pre-battery bounce condition in the portable electronic device. The computer readable program code can further cause a processor to respond to the detection of the pre-battery bounce condition by placing the portable electronic device in a pre-battery bounce setting.

The computer readable program code can further cause the processor to place the portable electronic device in the pre-battery bounce setting by shutting down non-critical components in the portable electronic device, storing a last known state in the portable electronic device, preventing a memory-write or attempting to complete a memory-write.

The computer readable program code can further cause the processor to determine whether a false pre-battery bounce condition exists before placing the portable electronic device in the pre-battery bounce setting. The computer readable program code can further cause the processor to determine when a battery bounce condition has ended. The computer readable program code can also cause the processor to switch the operation of the portable electronic device from a pre-battery bounce setting to a normal state on determining that the battery bounce condition has ended.

The various embodiments of the present invention described above provide a portable electronic device and method to protect the portable electronic device from a battery bounce condition. The incorporation of a free-fall condition sensor in a portable electronic device can eliminate the need for a complicated circuitry and software normally associated with the prevention of a battery bounce condition.

An advanced warning from the free-fall condition sensor on detecting a pre-battery bounce condition allows the portable electronic device to prevent a memory-write of critical data and to shut down a non-critical component using a relatively high current, such as display backlight, until the battery bounce condition has passed. Since the non-critical components using the relatively high current can be shut down in advance, the large capacitor required to maintain power while the backup battery is switched on, is no longer necessary.

The advanced warning from the free-fall condition sensor can be sufficient to store a non-critical data such as last known state of the portable electronic device, lock/unlock password and real time clock into the first memory before the occurrence of the battery bounce condition. The method of storing the non-critical data into the first memory on detecting the pre-battery bounce condition by the free-fall condition sensor can eliminate the need for the backup battery circuit altogether.

The advanced warning from the free-fall condition sensor on detecting the pre-battery bounce condition can make software design simpler, since it is easier to pause critical components before power becomes unstable than it is to recover the portable electronic device from a power drop after the battery bounce condition.

Those of skill in the art will, however, appreciate that the invention is not limited to the advantages of incorporating a free-fall condition sensor in a portable electronic device mentioned above, and the invention shall have full scope of the claims. This disclosure is intended to explain how to fashion and use various embodiments in accordance with the invention rather than to limit the true, intended and fair scope and spirit thereof. The foregoing discussion is not intended to be exhaustive or to limit the invention to the precise forms disclosed. Modifications or variations are possible in the light of the above teachings. The embodiment(s) was chosen and described to provide the best illustration of the principles of the invention and practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A portable electronic device, comprising:
    a non-critical component, wherein the non-critical component is a display backlight, a transmitter, a camera, or a digital media player;
    a free-fall condition sensor enabled to detect a pre-battery bounce condition in the portable electronic device; and
    a processor coupled to the free-fall condition sensor, wherein the processor, in response to a detection of the pre-battery bounce condition by the free-fall condition sensor, is operable to place the portable electronic device in a pre-battery bounce setting;
    wherein the processor is operable to place the portable electronic device in the pre-battery bounce setting by shutting down the non-critical component.

2. The portable electronic device of claim 1, wherein the portable electronic device includes a memory, the memory comprises a first memory and a second memory, wherein the first memory stores non-critical data and the second memory stores critical data.

3. The portable electronic device of claim 2, wherein the processor is further operable to prevent a memory-write to the second memory if a pre-battery bounce condition is detected and to prevent or attempt to complete a memory-write to the first memory if a pre-battery bounce condition is detected.

4. The portable electronic device of claim 2, wherein the processor is further operable to store the last known state or a lock/unlock password in the first memory if a pre-battery bounce condition is detected.

5. The portable electronic device of claim 1, wherein the processor is further operable to determine whether a false pre-battery bounce condition exists before placing the portable electronic device in the pre-battery bounce setting.

6. The portable electronic device of claim 1, wherein the processor is further operable to:
    determine when a battery bounce condition has ended; and
    switch the operation of the portable electronic device from the pre-battery bounce setting to a normal state.

7. A method to protect a portable electronic device, the method comprising:
    detecting a pre-battery bounce condition in the portable electronic device; and
    in response to the detection of the pre-battery bounce condition, placing the portable electronic device in a pre-battery bounce setting;
    wherein placing the portable electronic device in the pre-battery bounce setting further comprises: shutting down a non-critical component in the portable electronic device, wherein the non-critical component is a display backlight, a transmitter, a camera, or a digital media player.

8. The method of claim 7, wherein the portable electronic device includes a memory, the memory comprises a first memory and a second memory and the method further comprises storing non-critical data in the first memory and storing critical data in the second memory.

9. The method of claim 8, further comprising preventing a memory-write to the second memory if a pre-battery bounce condition is detected and preventing or attempting to complete a memory-write to the first memory if a pre-battery bounce condition is detected.

10. The method of claim 8, further comprising storing the last known state or a lock/unlock password in the first memory if a pre-battery bounce condition is detected.

11. The method of to claim 7, further comprising determining whether a false pre-battery bounce condition exists before placing the portable electronic device in the pre-battery bounce setting.

12. The method of claim 7, further comprising:
    determining when a battery bounce condition has ended; and
    switching the operation of the portable electronic device from the pre-battery bounce setting to a normal state.

13. The portable electronic device of claim 1, wherein the processor is operable to place the portable electronic device in the pre-battery bounce setting by further storing a last known state in the portable electronic device.

14. The method of claim 7, wherein placing the portable electronic device in the pre-battery bounce setting further comprises storing a last known state in the portable electronic device.

15. The portable electronic device of claim 1, wherein the processor is operable to place the portable electronic device in the pre-battery bounce setting by further attempting to complete a memory write.

16. The method of claim 7, wherein placing the portable electronic device in the pre-battery bounce setting further comprises attempting to complete a memory write.

* * * * *